(12) United States Patent
Xu

(10) Patent No.: US 9,328,398 B2
(45) Date of Patent: May 3, 2016

(54) METHOD FOR RECYCLING NOBLE METAL FROM ELECTRONIC WASTE MATERIAL AND APPARATUS THEREOF

(75) Inventor: Kaihua Xu, Shenzhen (CN)

(73) Assignee: GEM CO., LTD., Shenzhen (CN)

( * ) Notice: Subject to any disclaimer, the term of this patent is extended or adjusted under 35 U.S.C. 154(b) by 159 days.

(21) Appl. No.: 13/823,076

(22) PCT Filed: Oct. 27, 2010

(86) PCT No.: PCT/CN2010/078167
§ 371 (c)(1),
(2), (4) Date: Mar. 13, 2013

(87) PCT Pub. No.: WO2012/048474
PCT Pub. Date: Apr. 19, 2012

(65) Prior Publication Data
US 2013/0174694 A1    Jul. 11, 2013

(30) Foreign Application Priority Data

Oct. 12, 2010   (CN) .......................... 2010 1 0506134

(51) Int. Cl.
*C22B 4/04* (2006.01)
*C22B 4/08* (2006.01)
*C22B 11/02* (2006.01)

(52) U.S. Cl.
CPC ... *C22B 4/04* (2013.01); *C22B 4/08* (2013.01); *C22B 11/025* (2013.01); *Y02W 30/54* (2015.05)

(58) Field of Classification Search
CPC ............ C22B 4/04; C22B 11/025; C22B 4/08
See application file for complete search history.

(56) References Cited

U.S. PATENT DOCUMENTS 5,843,287 A   12/1998  Wicks et al.

FOREIGN PATENT DOCUMENTS

| CN | 1927480 A | 3/2007 |
|---|---|---|
| CN | 101311280 A | 11/2008 |

OTHER PUBLICATIONS

Machine translation of CN 1927480, 2007.*

* cited by examiner

*Primary Examiner* — Rebecca Lee
(74) *Attorney, Agent, or Firm* — Shimokaji IP

(57) ABSTRACT

A method for recycling noble metals from electronic waste materials and apparatus thereof. The method comprises the following steps: mechanically breaking up the electronic waste materials; removing rubber and plastic materials by electrostatic separation; removing ferromagnetic metals by magnetic separation; removing residual rubber and plastic materials by microwave pyrolysis; removing low-melting-point metals by indirectly heating using microwave; separating the noble metals from one another in turn from low-melting-point metal to high-melting-point metal for recycle. The apparatus includes a microwave housing. A filtering screen is positioned on the inside wall of the housing horizontally, and vertically-arranged and open-ended heating pipes are positioned over the filtering screen. The method and apparatus can adequately recycle resources in the electronic waste materials.

9 Claims, 5 Drawing Sheets

| Step (1) |
| --- |
| taking electronic waste materials containing noble metals, mechanically breaking up and sieving to obtain electronic waste powders containing noble metals; |

| Step (2) |
| --- |
| taking the electronic waste powders containing noble metals, removing rubber and plastic materials by electrostatic separation, collecting noble metal-rich part; |

| Step (3) |
| --- |
| taking the noble metal-rich part, removing ferromagnetic metals by magnetic separation, collecting ferromagnetism-free metal-rich part; |

| Step (4) |
| --- |
| taking and feeding the ferromagnetism-free metal-rich part into heating chamber from feed inlet of microwave reactor, shutting the feed inlet valve and valve that connects the channels, heating to pyrogenation temperature $T_1 = 400\sim600°C$ by microwave, collecting gases generated by pyrolysis at exhaust outlet; |

| Step (5) |
| --- |
| heating to melting temperature $T_2 = 700\sim900°C$ by microwave, melting stannum, lead, antimony and other low-melting-point metals, keeping melting for 5~30 minutes, vacuum filtrating, collecting filtrate A and residues A separately; |

| Step (6) |
| --- |
| continue to heat residues A to melting temperature $T_3 = 990\sim1020°C$ by microwave, melting metal silver, keeping melting for 5~30 minutes, vacuum filtrating, collecting filtrate B and residues B separately; |

| Step (7) |
| --- |
| Microwave-melting method was applied: taking residues B, heating to melting temperature $T_4 = 1070\sim1075°C$ by microwave, melting metal gold, keeping melting for 5~30 minutes, vacuum filtrating, collecting filtrate C and residues C separately; taking residues C, heating to melting temperature $T_5 = 1480\sim1520°C$ by microwave, melting metal copper, keeping melting for 5~30 minutes, vacuum filtrating, collecting filtrate D and residues D separately; taking residues D, heating to melting temperature $T_6 = 1580\sim1750°C$ by microwave, melting metal palladium, keeping melting for 5~30 minutes, vacuum filtrating, collecting filtrate E and residues E separately; taking residues E, heating to melting temperature $T_7 = 1800\sim1900°C$ by microwave, melting metal platinum, keeping melting for 5~30 minutes, vacuum filtrating, collecting filtrate F and residues F separately. |

Fig. 2

| Step (1) |
| --- |
| taking electronic waste materials containing noble metals, mechanically breaking up and sieving to obtain electronic waste powders containing noble metals; |

| Step (2) |
| --- |
| taking the electronic waste powders containing noble metals, removing rubber and plastic materials by electrostatic separation, collecting noble metal-rich part; |

| Step (3) |
| --- |
| taking the noble metals-rich part, removing ferromagnetic metals by magnetic separation, collecting ferromagnetism-free metal-rich part; |

| Step (4) |
| --- |
| taking and feeding the ferromagnetism-free metal-rich part into heating chamber from feed inlet of microwave reactor, shutting the feed inlet valve and valve that connects the channels, heating to pyrogenation temperature $T_1 = 400\sim600°C$ by microwave, collecting gases generated by pyrolysis at exhaust outlet; |

| Step (5) |
| --- |
| heating to melting temperature $T_2 = 700\sim900°C$ by microwave, melting stannum, lead, antimony and other low-melting-point metals, keeping melting for 5~30 minutes, vacuum filtrating, collecting filtrate A and residues A separately; |

| Step (6) |
| --- |
| continue to heat residues A to melting temperature $T_3 = 990\sim1020°C$ by microwave, melting metal silver, keeping melting for 5~30 minutes, vacuum filtrating, collecting filtrate B and residues B separately; |

| Step (7) |
| --- |
| Acid-liquor-filtration and microwave-melting methods were applied: taking residues B, adding a strong acid like hydrochloric acid, nitric acid, sulfuric acid or other normal strong acids, dissolving the whole metal copper and its oxidants, its chlorides or others in acid liquor and passing through the filtering screen to form filtrate G and residues G; taking residues G, heating to melting temperature $T_8 = 1070\sim1075°C$ by microwave, melting metal gold, keeping melting for 5~30 minutes, vacuum filtrating, collecting filtrate H and residues H separately; taking residues H, heating to melting temperature $T_9 = 1580\sim1750°C$ by microwave, melting metal palladium, keeping melting for 5~30 minutes, vacuum filtrating, collecting filtrate I and residues I separately; taking residues I, heating to melting temperature $T_{10} = 1800\sim1900°C$ by microwave, melting metal platinum, keeping melting for 5~30 minutes, vacuum filtrating, collecting filtrate J and residues J separately. |

Fig. 4

METHOD FOR RECYCLING NOBLE METAL FROM ELECTRONIC WASTE MATERIAL AND APPARATUS THEREOF

PRIORITY INFORMATION

The present application claims priority to Chinese Application No. 201010506134.2, entitled Method for Recycling Noble Metals from Electronic Waste Materials Containing Noble Metals and Apparatus Thereof, filed on Oct. 12, 2010, the entire contents of which are hereby incorporated by reference.

FIELD OF THE INVENTION

The present invention relates to industrial-waste treatment, more particularly to method for recycling noble metals from electronic waste material containing noble metals and apparatus thereof.

BACKGROUND OF THE INVENTION

"Waste materials containing noble metals" refers to waste components, waste residues and waste water, which contain gold, silver, platinum, palladium, rhodium, ruthenium, iridium and other noble metals. The widely sources of raw materials mainly concentrate in minerals, smelting, electronics, electroplate, chemical industry. Because noble metals are rare, difficult to refine and valuable, it has huge economic and social benefits to recycle noble metals from waste materials containing noble metals.

Waste materials containing noble metals originated from electronics mainly are: waste circuit boards (including printed circuit boards, integrated circuit plate), the treatment techniques commonly used comprise: mechanical crush, hydrometallurgy, thermo metallurgy or their combinations. Nevertheless, the recycling process has disadvantages of being energy-wasting, inducing pollution, low-productivity, high-cost, etc.

Chinese patent having a publication number of CN1927480A provided a method for treating electronic wastes, which uses microwave irradiation to rapidly pyrolyze electronic wastes, to separate lead and stannum at reaction temperature 600~800° C., to separate copper, zinc, silver, nickel at reaction temperature 900~1500° C. However, this invention described neither the process of how the melted metals break away from electronic components, nor the structure of microwave reactor.

Chinese patent having a publication number of CN200958111Y provided an industrial microwave smelting equipment comprising units of housing, internal furnace, furnace lid, continuously-feeding device, infrared-temperature detector, etc. But the infrared-temperature detector therein was positioned on the top of housing, thus failing to reflect the smelting temperature in the furnace. Moreover, because the utility model was used for reducing and smelting metals, and for cooling residues after the metals were smelted, so it provided a closed-loop water cooling system, thus increasing not only the complexity of structure of microwave smelting equipment, but manufacturing costs. More important, such utility model was used to heat ores and metals directly by mixing waste material with other substances which can absorb microwave, which makes the simple waste material components become complicated; it is not beneficial to separate noble metals.

SUMMARY OF THE INVENTION

Solving the above problems, the present invention aims to provide a method for recycling noble metals from electronic waste materials, the method is energy saving and of high efficiency, easy to control and pollution-free; and to provide an apparatus for recycling noble metals from electronic waste materials. Having reasonable design, the apparatus of the present invention is favorable for fastening the reaction and for separating solid and liquid when melting noble metals, and is convenient for automatic operation.

One aspect of the present invention is to provide a method for recycling noble metals from electronic waste materials containing noble metals, comprising the following steps:

(1) taking electronic waste materials containing noble metals, mechanically breaking up and sieving to obtain electronic waste powders containing noble metals;

(2) taking the electronic waste powders containing noble metals, removing rubber and plastic materials by electrostatic separation, collecting noble metal-rich part;

(3) taking the noble metal-rich part, removing ferromagnetic metals by magnetic separation, collecting ferromagnetism-free metal-rich part;

(4) taking the ferromagnetism-free metal-rich part, feeding the ferromagnetism-free metal-rich part into heating chamber from feed inlet of microwave reactor, shutting the feed inlet valve and valve that connects the channels, heating to pyrogenation temperature $T_1$=400~600° C. by microwave, collecting gases generated by pyrolysis at exhaust outlet;

(5) heating to melting temperature $T_2$=700~900° C. by microwave, melting stannum, lead, antimony and other low-melting-point metals, keeping melting for 5~30 minutes, allowing the melted low-melting-point metal liquor to pass through the filtering screen, collecting filtrate A and residues A separately;

(6) continue to heat the residues A to melting temperature $T_3$=990~1020° C. by microwave, melting metal silver, keeping melting for 5~30 minutes, allowing melted silver liquor to pass through the filtering screen, collecting filtrate B and residues B separately;

(7) taking residues B, applying one or more methods of microwave-melting, acid-liquor filtration, electrolysis and extraction to separate one or more noble metals individually.

Steps (1)~(3) of the present invention are pretreatment with materials aiming to break up and preliminarily purify electronic waste materials containing noble metals, to remove rubber and plastic materials and ferromagnetic metals mixed therein.

The term "electronic waste materials containing noble metals" refers to electronic waste materials or components containing eight metal elements of gold, silver and platinum group metals (ruthenium, rhodium, palladium, osmium, iridium, and platinum), which may also contain rubber and plastic materials, base metals and others. Noble metals are arranged in ascending order of melting point: silver having a melting point of 960° C., gold having a melting point of 1063° C., palladium having a melting point of 1552° C., platinum having a melting point of 1772° C., rhodium having a melting point of 1966° C., ruthenium having a melting point of 2250° C., iridium having a melting point of 2454° C., and osmium having a melting point of 3045° C.

The term "rubber and plastic materials" refers to a collective name of rubber materials and plastic materials, rubber and plastic materials have electrostatic properties.

The term "ferromagnetic metals" refers to metals having ferromagnetism above room temperature, such as iron, cobalt, nickel, etc.

Step (1) comprises: taking electronic waste materials containing noble metals as raw materials, mechanically preliminarily breaking up electronic waste materials containing noble metals, sieving, and then collecting electronic waste powders containing noble metals. Preferably, the electronic waste materials containing noble metals are preliminarily broken up into particles having size of 4 to 10 mm, then broken up further, passed through 3~5 mesh sieve.

Primary types of electronic waste materials containing noble metals are waste circuit boards, electronic components, waste cell phones and complete computers, etc.

Electrostatic separation in step (2) is a method of separation using electrostatic properties of rubber and plastic materials. During electrostatic separation, rubber and plastic materials carry charges, due to the effect of resultant force of electrostatic force, gravity and centrifugal force, so that rubber and plastic materials can be separated out. The remainders are noble metal-rich part, which may also comprise a little rubber and plastic materials.

Magnetic separation in step (3) is a method of separation carried out under the effect of magnetic force and other forces by taking advantages of the magnetism differences of materials. Iron, cobalt, nickel and other magnetic metals can be separated out during magnetic separation; the remainders are ferromagnetism-free metal-rich part.

After step (3), it is allowed to take a small amount of ferromagnetism-free metal-rich part to determine components, and determine recycling sequence of target metals according to ascending order of melting point of noble metals therein.

Steps (4)~(7) are stages of heating by microwave aiming to remove residual rubber and plastic materials and low-melting-point base metals in ferromagnetism-free metal-rich part at low temperature, then to separate each noble metal according to their different melting points.

All processes of heating by microwave are conducted in microwave reactor. Microwave reactor comprises microwave housing, microwave transmitter positioned on the inside wall of microwave housing, a feed inlet positioned inside the microwave housing for feeding, a microwave chamber formed in the hollow microwave housing, a filtering screen positioned on the inside wall of the housing horizontally, one or more heating pipes used to heat electronic waste powders containing noble metals positioned over the filtering screen, the heating pipes whose internal spaces are heating chamber provided for electronic waste powders containing noble metals to pass by and to be placed in are vertically-arranged and open-ended, temperature detector positioned over heating pipes, which is used to detect the temperature of heating pipes, exhaust outlet positioned over the microwave housing, which is used to get rid of gases generated by pyrolysis, and sub-pipeline positioned at the bottom of the microwave housing, which is used to discharge materials. Feed inlet, exhaust outlet and sub-pipeline all have valves.

Step (4) comprises: taking ferromagnetism-free metal-rich part, feeding ferromagnetism-free metal-rich part into heating chamber from feed inlet of microwave reactor, shutting the feed inlet valve and pipeline valve, heating to pyrogenation temperature $T_1$=400~600° C. by microwave. Residual rubber and plastic materials in ferromagnetism-free metal-rich part tend to decompose under heat, and generate gases. Gases generated by pyrolysis are collected at exhaust outlet. Preferably, pyrolysis temperature $T_1$ is 500° C.

Step (5) comprises: heating to melting temperature $T_2$=700~900° C. by microwave, melting stannum, lead, antimony and other low-melting-point metals, keeping melting for 5~30 minutes. Melting temperature $T_2$ should be higher than the melting point of metal antimony 630.5° C. and lower than the melting point of metal silver 960° C. Metal stannum, lead and antimony can be melted to form mixed melted liquor, and then be filtrated through the filtering screen from the top to the bottom to form filtrate A. Opening the sub-pipeline valve, and collecting filtrate. The remaining metals which failed to reach melting point still gather in ferromagnetism-free metal-rich part to form residues A over the filtering screen.

"Low-melting-point metals" herein refers to metals having melting point lower than 900° C., such as stannum having a melting point of 231.9° C., lead having a melting point of 327° C., and antimony having a melting point of 630.5° C. Such low-melting-point metals tend to form melted liquor at melting temperature $T_2$=700~900° C., thus can be separated out. Preferably, melting temperature $T_2$ is 700° C.

Preferably, microwave reactor further comprises vacuum housing that connects to the sub-pipeline positioned at the bottom of microwave housing, vacuum pump positioned over the vacuum housing, and feed outlet positioned at the bottom of said vacuum housing, vacuum chamber formed in the hollow vacuum housing. Because ferromagnetism-free metal-rich part contains only a few noble metals, thus may attach to un-melted metals after being melted; or, base metals may wrap noble metals residues/powders inside after base metals were melted, it is hard to achieve solid-melt separation. Sub-pipeline that connects to vacuum chamber is provided at the bottom of microwave reactor, which can filtrate melted metals under pressure, achieving a better solid-melt separation. To ensure vacuum filtration, it is allowed to keep the feed inlet valve and exhaust outlet closed. Thus, preferably, step (5) comprises: heating to melting temperature $T_2$=700~900° C. by microwave, keeping melting for 5~30 minutes, opening vacuum pump, melting stannum, lead, antimony and other low-melting-point metals at 0.2~0.5 atmosphere, vacuum filtrating, collecting filtrate A and residues A, separately. The filtrate A at the moment is mixed melted liquor of stannum, lead and antimony, which can flow spontaneously into vacuum chamber. Opening feed outlet valve, collecting filtrate. Residues A which are ferromagnetism-free metal-rich part containing one or more of silver, gold, copper, platinum group metals (ruthenium, rhodium, palladium, osmium, iridium, and platinum) and other high-melting-point metals are trapped over the filtering screen.

Step (6) comprises: continue to heat residues A to melting temperature $T_3$=990~1020° C. by microwave, melting metal silver, and keeping melting 5~30 minutes. The melting temperature $T_3$ should be higher than the melting point of metal silver 960° C. and lower than the melting point of metal gold 1063° C. Metal silver can be melted to form melted liquor, and then be filtrated through the filtering screen from the top to the bottom to form filtrate B, cooling naturally and casting. Opening the sub-pipeline valve, collecting filtrate B. The remaining metals which failed to reach melting point still gather in ferromagnetism-free metal-rich part to form residues B containing one or more of metal gold, copper and platinum group metals (ruthenium, rhodium, palladium, osmium, iridium, and platinum) over the filtering screen.

Alternatively, step (6) preferably comprises: heating to melting temperature $T_3$=990~1020° C. by microwave, keeping melting for 5~30 minutes, opening vacuum pump, melting metal silver at 0.2~0.5 atmosphere, vacuum filtrating, collecting filtrate B and residues B separately.

Step (7) comprises: taking residues B, applying one or more methods of microwave-melting, acid-liquor filtration, electrolysis and extraction to separate one or more noble metals individually. Therein, the noble metals can be one or more of gold and platinum group metals (ruthenium, rhodium, palladium, osmium, iridium, and platinum), which may also contain base metal copper. Noble metals, especially gold, palladium and platinum are the most common Preferably, microwave-melting method is applied in the step (7): taking residues B, heating to melting temperature $T_4=1070\sim1075°$ C. by microwave, melting metal gold, keeping melting for 5~30 minutes, allowing melted gold liquor to pass through the filtering screen, collecting filtrate C and residues C separately; taking residues C, heating to melting temperature $T_5=1480\sim1520°$ C. by microwave, melting metal copper, keeping melting for 5~30 minutes, allowing melted copper liquor to pass through the filtering screen, collecting filtrate D and residues D separately; taking residues D, heating to melting temperature $T_6=1580\sim1750°$ C. by microwave, melting metal palladium, keeping melting for 5~30 minutes, allowing melted palladium liquor to pass through the filtering screen, collecting filtrate E and residues E separately; taking residues E, heating to melting temperature $T_7=1800\sim1900°$ C. by microwave, melting metal platinum, keeping melting for 5~30 minutes, allowing melted platinum liquor to pass through the filtering screen, collecting filtrate F and residues F separately. The entire operating steps are similar to the aforementioned step (5) and (6), and can preferably adopt vacuum filtration, filtrate can flow into vacuum chamber spontaneously, and can be collected immediately after opening feed outlet valve. Herein, melting temperature $T_4$ should be higher than the melting point of metal gold 1063° C. and lower than the melting point of metal copper 1083° C. Preferably, melting temperature $T_4=1070°$ C. Filtrate C is melted metal gold liquor, which is taken out for cooling naturally and casting. Residues C are ferromagnetism-free metal-rich part containing copper, platinum and palladium. Melting temperature $T_5$ should be higher than the melting point of metal copper 1083° C. and lower than the melting point of metal palladium 1552° C. Preferably, melting temperature $T_5=1480°$ C. Filtrate D is melted metal copper liquor. Residues D are ferromagnetism-free metal-rich part containing platinum and palladium. Melting temperature $T_6$ should be higher than the melting point of metal palladium 1552° C. and lower than the melting point of metal platinum 1772° C. Preferably, melting temperature $T_6=1580°$ C. Filtrate E is melted metal palladium liquor, which is taken out for cooling naturally and casting. Residues E are ferromagnetism-free metal-rich part containing platinum. Melting temperature $T_6$ should be higher than the melting point of metal palladium 1552° C. and lower than the melting point of metal platinum 1772° C. Preferably, melting temperature $T_7=1800°$ C. Filtrate F is melted metal platinum liquor, which is taken out for cooling naturally and casting, the residues F are discarded.

Preferably, acid-liquor filtration method is applied in the step (7): taking residues B, adding a strong acid like hydrochloric acid, nitric acid, sulfuric acid and other normal strong acids, dissolving the whole metal copper and its oxidants, its chlorides and others in acid liquor and passing through the filtering screen to form filtrate G and residues G. Noble metal gold and platinum group metals (ruthenium, rhodium, palladium, osmium, iridium, and platinum) are not soluble in strong acid, thus being trapped over the filtering screen to form residues G. When residues G only contain one of gold and platinum group metals, it is no need to conduct separation. When residues G contain many of gold and platinum group metals, traditional technique of electrolysis or extraction can be used, and noble metals are collected separately.

Preferably, acid-liquor filtration method and microwave-melting method are applied in the step (7): taking residues B, adding a strong acid like hydrochloric acid, nitric acid, sulfuric acid and other normal strong acids, dissolving the whole metal copper and its oxidants, its chlorides and others in acid liquor and passing through the filtering screen to form filtrate G and residues G. When residues G only contain one of gold and platinum group metals, it is no need to conduct separation. When residues G contain many of gold and platinum group metals, taking residues G, heating to melting temperature $T_8=1070\sim1075°$ C. by microwave, melting metal gold, keeping melting for 5~30 minutes, allowing melted gold liquor to pass through the filtering screen, collecting filtrate H and residues H separately; taking residues H, heating to melting temperature $T_9=1580\sim1750°$ C. by microwave, melting metal palladium, keeping melting for 5~30 minutes, allowing melted palladium liquor to pass through the filtering screen, collecting filtrate I and residues I separately; taking residues I, heating to melting temperature $T_{10}=1800\sim1900°$ C. by microwave, melting metal platinum, keeping melting for 5~30 minutes, allowing melted platinum liquor to pass through the filtering screen, collecting filtrate J and residues J separately.

Preferably, whether one or more methods of microwave-melting, acid-liquor filtration, electrolysis and extraction are applied in step (7), the filtration therein can be vacuum filtration if filtration is involved in the steps, filtrate can flow spontaneously into vacuum chamber, and can be collected immediately after opening feed outlet valve.

Waste materials containing noble metals can also contain one or more of noble metals of rhodium, ruthenium, iridium and osmium. Likewise, they can be separated and recycled according to ascending order of their melting points.

Preferably, after step (7), using microwave-melting method to separate one or more of noble metals of rhodium, ruthenium, iridium and osmium (melting point of rhodium is 1966° C., melting point of ruthenium is 2250° C., melting point of iridium is 2454° C. and the melting point of osmium is 3045° C.) as hereinbefore described.

Another aspect of the present invention is to provide an apparatus for recycling noble metals from electronic waste materials containing noble metals, comprising: microwave housing, microwave transmitter positioned on the inside wall of microwave housing, a feed inlet positioned inside the microwave housing for feeding, a microwave chamber formed in the hollow microwave housing, a filtering screen positioned on the inside wall of the housing horizontally, one or more heating pipes used to heat electronic waste powders containing noble metals positioned over the filtering screen, the heating pipes whose internal spaces are heating chambers provided for electronic waste powders containing noble metals to pass by and to be placed in are vertically-arranged and open-ended, temperature detector positioned over heating pipes, which is used to detect the temperature of heating pipes, exhaust outlet positioned over the microwave housing, which is used to get rid of gases generated by pyrolysis, and sub-pipeline positioned at the bottom of the microwave housing, which is used to discharge materials.

Microwave transmitter is positioned on the inside wall of microwave housing, microwave transmitter can supply microwave to generate heat within the microwave housing. Microwave heating has the following advantages: (1) fast heating-up: as for conventional heating, the transfer of heats from the surface of material to the inside raises the core temperature; microwave heating is a kind of heating process, as distinct from conventional heating, in which electromagnetic radiation heats a dielectric material and transmits, heating both external and internal spaces of dielectric materials, therefore, it is possible to heat evenly in a short time; (2) heating evenly: when heating by microwave, no matter what shape the material exhibits, the microwave can permeate uniformly with generating heats, and therefore greatly improve the uniformity, avoiding the phenomenon characterized by the simultaneous presence of cold in the outside and heat in the inside; (3) energy-saving and high efficiency: different materials have different absorption rate of the microwave, in a closed microwave chamber, the electromagnetic wave cannot leak but can be absorbed by the material being heated inside. and the air in the microwave chamber and the corresponding microwave housing are not heated, so the thermal efficiency is high, simultaneously, the temperature of workplace will also not be increased, and the production environment is improved significantly; (4) easy to control: the microwave power is controlled by adjusting the switches and knobs, which makes it to be available for use immediately, no thermal inertia, power is continuously adjustable, easy to operate automatically.

However, metals do not absorb microwave, that is, in spite of the fact that microwave-heating has many advantages; it cannot be applied in melting metals directly. The apparatus of the present invention is a very good solution to solve this problem.

Heating pipes are made of high temperature resistant ceramic materials, whose role is to form heating chamber, heating pipes can exchange heat with electronic powders containing noble metals placed in the heating chamber, and indirectly heat noble metals to make them melt. Heating pipes are positioned in microwave chamber, and vertically-arranged and open-ended. Their internal spaces are heating chambers provided for electronic waste powders containing noble metals to pass by and to be placed in. The effect of microwave is to heat up heating pipes, and then transfer heats to electronic waste powders containing noble metals, making the noble metals therein melt.

If pipe diameter is too large, electronic waste powders containing noble metals cannot contact with the heating pipes so well to achieve heating and melting; if pipe diameter is too small, it is difficult for electronic waste powders containing noble metals to fill and disperse in heating chamber, however, they accumulate above the heating pipes, resulting in bad heating effect. Preferably, height of heating pipes is in the range of 10~100 cm, pipe diameter is in the range of 3~10 cm. The number of heating pipes is unlimited.

Temperature detector which can reflect the temperature of heating pipes is positioned over heating pipes.

Filtering screen is positioned on the inside wall of the housing and below heating pipes, is used to separate unmelted solid metals and melted metals, achieving solid-melt separation.

Microwave housing also has feed inlet and exhaust outlet that all have valves built in, which is used to control the flow of materials. After pyrolysis of rubber and plastic materials, opening the exhaust outlet valve to release and collecting gases generated by pyrolysis.

At the bottom of microwave housing, there is sub-pipeline which also has valve built in, materials in the microwave housing can be collected after opening the sub-pipeline valve.

Inside wall of microwave housing, heating pipes, filtering screen, sub-pipeline and valves of feed inlet, exhaust outlet and sub-pipeline are all made of high temperature resistant ceramic materials.

Because electronic waste powders containing noble metals contains only a few noble metals, thus may attach to unmelted metals after being melted; or, base metals may wrap noble metals residues/powders inside after base metals were melted, it is hard to achieve solid-melt separation. Sub-pipeline that connects to vacuum chamber is provided at the bottom of microwave reactor, which can filtrate melted metals under pressure, achieving a better solid-melt separation.

Preferably, microwave reactor further comprises vacuum housing that connects to the sub-pipeline positioned at the bottom of microwave housing, vacuum pump positioned over the vacuum housing, and feed outlet positioned at the bottom of the vacuum housing, vacuum chamber formed in the hollow vacuum housing. To ensure vacuum filtration, the feed inlet valve and exhaust outlet can be kept closed.

Preferably, vacuum housing, vacuum pump and feed outlet valve are all made of high temperature resistant materials.

The present invention provides a method for recycling noble metals from electronic waste material and apparatus thereof, having the following beneficial effects:

(1) Method of the present invention is used to heat electronic waste containing noble metals by using microwave device, to make it melting rapidly, thus noble metals can be separated and recycled in turn, according to ascending order of melting point of noble metals. The present method has advantages of fast heating-up, heating evenly is energy saving, easy to control, pollution-free and low-costs. Method of the present invention can also be used to separate and recycle other normal metals having great differences between their melting points, and it is not restricted to microwave absorbability of materials. Besides electronic waste containing noble metals, the present method can also be used to recycle other waste materials containing noble metals, such as dental materials, jewelry and others.

(2) Having reasonable design, the apparatus of the present invention is favorable for fastening the reaction, and solid-liquid separation when melting noble metals, and is convenient for automatic operation.

(3) The present invention is to recycle noble metals, which is maximum utilization of the resource of waste materials, and has huge economic and social benefits.

BRIEF DESCRIPTION OF THE DRAWINGS

FIG. 2 is flow chart A of the method of the present invention;

FIG. 4 is flow chart C of the method of the present invention;

Figure 5:
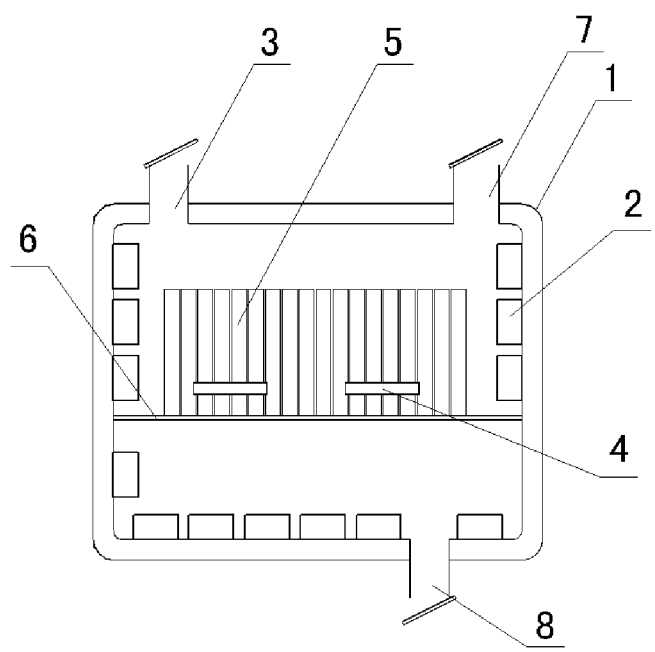
FIG. 5 is sectional view A of the apparatus of the present invention.
Figure 6:
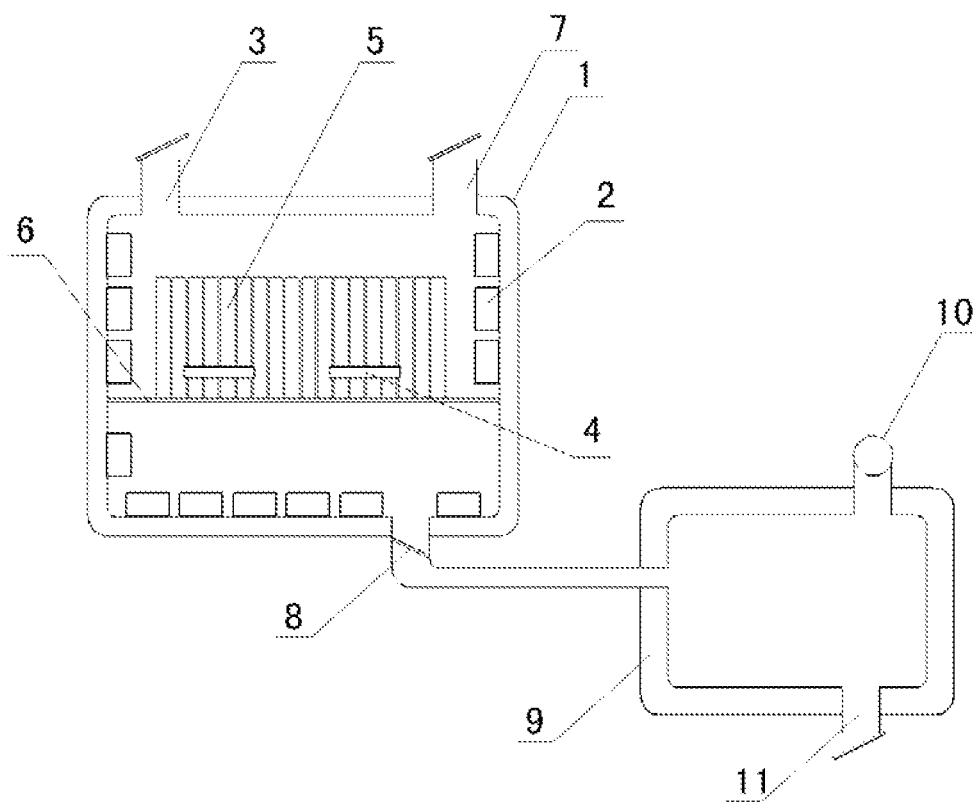
FIG. 6 is sectional view B of the apparatus of the present invention.

The reference numbers given in FIG. 5 and FIG. 6 are: 1. Microwave housing, 2. Microwave transmitter, 3. Feed inlet, 4. Temperature detector, 5. Heating pipes, 6. Filtering screen, 7. Exhaust outlet, 8. Sub-pipeline, 9. Vacuum housing, 10. Vacuum pump, 11. Feed outlet.

DETAILED DESCRIPTION OF ILLUSTRATED EMBODIMENTS

Further description of the present invention will be illustrated, which combined with embodiments in the drawings, in order to make the purpose, the technical solution and the advantages clearer. While the present invention has been described with reference to particular embodiments, it will be understood that the embodiments are illustrative and that the invention scope is not so limited.

Figure 1:
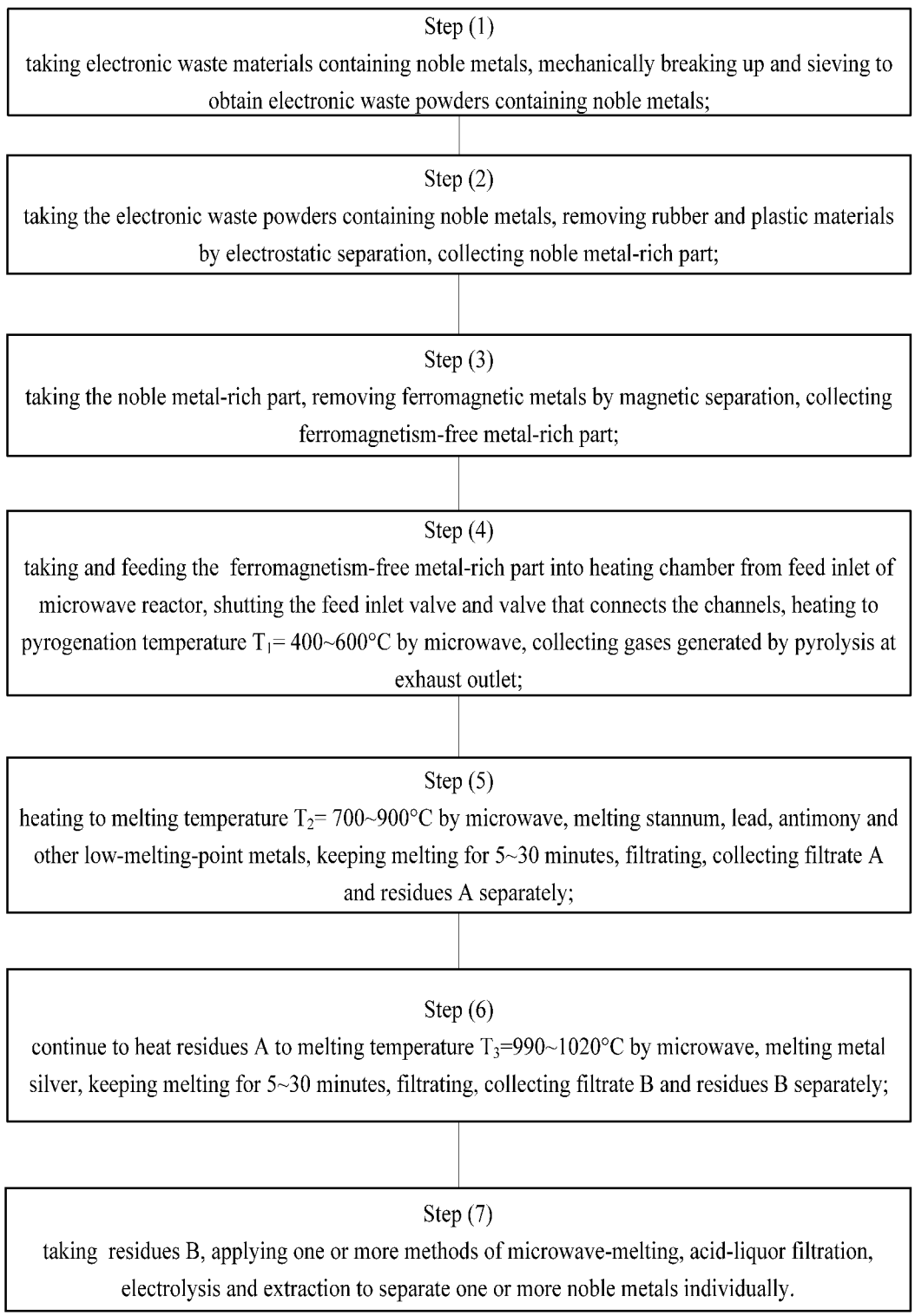
FIG. 1 is a flow chart of the method of the present invention.

A flow chart of the method for recycling noble metals from electronic waste material containing noble metals of the present invention is shown in FIG. 1.

Example 1

Flow Chart a of the Method of the Present Embodiment is Shown in FIG. 2

Raw materials: waste computer circuit boards (1 ton)

|  | plastic | Cu | Fe | Pd | Sn | Ni | Sb | Ag | Au | Pt | Pd |
|---|---|---|---|---|---|---|---|---|---|---|---|
| content/kg | 272 | 130 | 41 | 29 | 20 | 18 | 10 | 9 | 0.45 | 0.05 | 0.02 |
| Melting point/° C. | 500 | 1083 | / | 327 | 231.9 | 1455 | 630.5 | 960 | 1063 | 1772 | 1552 |

Process:

Step (1)

After manually disassembling waste circuit boards, harmful electronic components such as battery, transformer, etc., and reusable parts were dismantled, the remainders were firstly transferred to primary crusher by scraper conveyor, being broken up into particles having size less than 20 mm, then transferred to secondary crusher to break up into particles having size less than 5 mm.

Step (2)

The materials above were put into electrostatic separation device for electrostatic separation to obtain 280 kg of metal-rich part and 720 kg of plastic-rich part.

Step (3)

Putting into magnetic separation machine to remove materials containing ferromagnetic metals like iron, cobalt, nickel, etc, then obtaining 70 kg of powders containing iron and nickel, 210 kg of ferromagnetism-free metal-rich part, passing through 3~5 mesh sieve.

Step (4)

Feeding the materials above into microwave heating device from the feed inlet, and then closing the feed inlet valve and sub-pipeline valve. Heating to pyrolysis temperature $T_1=400°$ C. by microwave to remove residual organic matters in metal-rich part, opening exhaust outlet valve and collecting gases generated by pyrolysis.

Analyzing metal-rich part, the results are: silver 9 kg, gold 0.4 kg, platinum 0.05 kg, palladium 0.02 kg. Target noble metals are arranged according to ascending order of melting point of noble metals.

| | Target noble metals | | | |
|---|---|---|---|---|
| | I silver | II gold | III palladium | IV platinum |
| Melting point | 960° C. | 1063° C. | 1552° C. | 1772° C. |

Step (5)

Recycling silver: commanded by computers, heating to melting temperature $T_2$ by microwave ($T_2$ should be lower than the melting point of silver and higher than the melting point of stannum and antimony), the melting temperature of the present embodiment $T_2=700°$ C., and keeping melting for 30 minutes. Opening vacuum pump to make the pressure in vacuum chamber to decline to 0.2 atmosphere. Closing vacuum pump, feed inlet valve, exhaust outlet valve, feed outlet valve, and opening sub-pipeline valve. Vacuum filtrating, the filtrate was mixed melted liquor of stannum, antimony and lead, the residues were metal-rich part containing silver, copper, gold, platinum and palladium. Filtrate flow into vacuum chamber spontaneously. Opening feed outlet valve and taking out solution of stannum, antimony and lead while closing sub-pipeline valve and feed outlet valve.

Step (6)

Commanded by computer, heating to melting temperature $T_3$ by microwave ($T_3$ should be higher than the melting point of silver and lower than the melting point of copper, lead, gold, platinum and palladium), the melting temperature of the present embodiment $T_3=990°$ C., and keeping melting for 20 minutes. Opening vacuum pump to make the pressure in vacuum chamber to decline to 0.3 atmosphere. Closing vacuum pump and feed outlet valve, opening sub-pipeline valve, vacuum filtrating, the filtrate was melted silver liquor, the residues were metal-rich part containing copper, gold, platinum and palladium. Melted silver liquor flows into vacuum chamber spontaneously. Opening feed outlet valve and taking out melted silver liquor, cooling naturally and casting. Closing sub-pipeline valve and feed outlet valve.

Step (7) Microwave-Melting Method was Applied

Recycling gold: commanded by computer, heating to melting temperature $T_4$ by microwave ($T_4$ should be higher than the melting point of gold and lower than the melting point of copper, platinum and palladium), the melting temperature of the present embodiment $T_4=1070°$ C., and keeping melting for 10 minutes. Opening vacuum pump to make the pressure in vacuum chamber to decline to below 0.4 atmosphere. Closing vacuum pump and feed outlet valve, opening sub-pipeline valve, vacuum filtrating, melted gold liquor flows into vacuum chamber spontaneously. Opening feed outlet valve and taking out melted gold liquor, cooling naturally and casting. Closing sub-pipeline valve and feed outlet valve.

Recycling palladium: commanded by computer, heating to melting temperature $T_5$ by microwave ($T_5$ should be lower than the melting point of palladium and higher than the melting point of copper), the melting temperature of the present embodiment $T_5=1480°$ C., and keeping melting for 10 minutes. Opening vacuum pump to make the pressure in vacuum chamber to decline to 0.5 atmosphere. Closing vacuum pump and feed outlet valve, opening sub-pipeline valve, vacuum filtrating, the filtrate was melted copper liquor, the residues were metal-rich part containing platinum and palladium. Filtrate flow into vacuum chamber spontaneously. Opening feed outlet valve and taking out melted copper liquor, Closing sub-pipeline valve and feed outlet valve. commanded by computer, heating to melting temperature $T_6$ by microwave ($T_6$ should be higher than the melting point of palladium and lower than the melting point of platinum), the melting temperature of the present embodiment $T_6=1580°$ C., and keeping melting for 10 minutes. Opening vacuum pump to make the pressure in vacuum chamber to decline to 0.5 atmosphere. Closing vacuum pump and feed outlet valve, opening sub-pipeline valve, vacuum filtrating, the filtrate was melted palladium liquor, the residues were platinum. Melted palladium liquor flows into vacuum chamber spontaneously. Opening feed outlet valve and taking out melted palladium liquor, Closing sub-pipeline valve and feed outlet valve.

Recycling platinum: commanded by computer, heating to melting temperature $T_7$ by microwave ($T_7$ should be higher than the melting point of platinum), the melting temperature of the present embodiment $T_7=1800°$ C., and keeping melting for 10 minutes. Opening vacuum pump to make the pressure in vacuum chamber to decline to 0.5 atmosphere. Closing vacuum pump and feed outlet valve, opening sub-pipeline valve, vacuum filtrating, melted platinum liquor flows into vacuum chamber spontaneously. Opening feed outlet valve and taking out melted platinum liquor, cooling naturally and casting. Closing sub-pipeline valve and feed outlet valve.

Example 2

Figure 3:
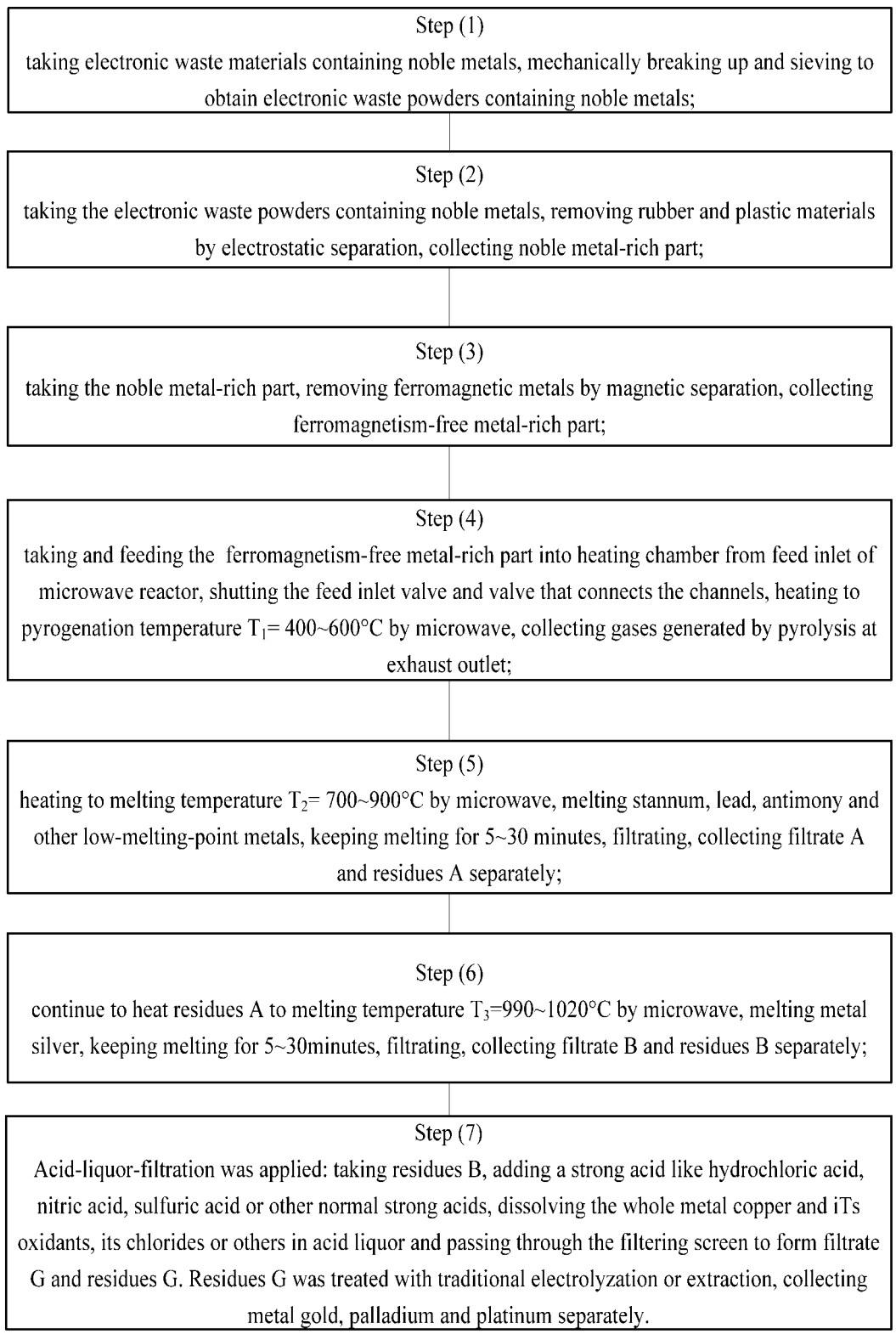
FIG. 3 is flow chart B of the method of the present invention.

Flow Chart B of the Method of the Present Embodiment is Shown in FIG. 3

Raw materials and steps (1)~(6) were similar to Example 1, the differences lie in the fact that in Example 2, pyrolysis temperature $T_1=600°$ C., melting temperature $T_2=900°$ C., melting temperature $T_3=1020°$ C., all vacuum pressure during the process of vacuum filtration was 0.5 atmosphere, time of melting was 10 minutes.

Step (7): Acid-Liquor-Filtration, Electrolysis, Extraction and Other Methods were Applied Feeding sulfuric acid (10%) from feed inlet to submerge residues, and metal copper and its oxidants, chlorides were all dissolved in acid liquor and passed through filtering screen. After 30 minutes, closing the vacuum pump and feed outlet valve, opening sub-pipeline valve, vacuum filtrating, saline solution of base metals flows into vacuum chamber spontaneously. Opening feed outlet valve and taking out salt solution of base metals, rinsing the feed inlet, filtrating. Closing sub-pipeline valve and feed outlet valve.

Electrolysis, extraction and other methods well know in the art were applied to separate and recycle gold, platinum and palladium, respectively.

Example 3

Flow Chart C of the Method of the Present Embodiment is Shown in FIG. 4)

Raw materials and step (1)~(6) were similar to Example 1, the differences lie in the fact that in Example 3, pyrolysis temperature $T_1=500°$ C., melting temperature $T_2=800°$ C., melting temperature $T_3=1000°$ C., all vacuum pressure during the process of vacuum filtration was allowed to be in the range of 0.2~0.5 atmosphere, time of melting was allowed to be in the range of 5~30 minutes.

Step (7): Acid-Liquor-Filtration and Microwave-Melting Method were Applied

Feeding sulfuric acid (10%) from feed inlet to submerge residues, and metal copper and its oxidants, chlorides were dissolved in acid liquor, filtrating. After 30 minutes, closing the vacuum pump and feed outlet valve, opening sub-pipeline valve, vacuum filtrating, saline solution of base metals flows into vacuum chamber spontaneously. Opening feed outlet valve and taking out salt solution of base metals, rinsing the feed inlet, filtrating. Closing sub-pipeline valve and feed outlet valve. Heating to melting temperature $T_8=1070°$ C. by microwave, melting metal gold, keeping melting for 10 minutes, allowing melted gold liquor to pass through the filtering screen, collecting filtrate and residues separately, filtrate was melted gold, residues contain metal palladium and platinum. Taking residues, heating to melting temperature $T_9=1750°$ C. by microwave, melting metal palladium, keeping melting for 10 minutes, allowing melted palladium liquor to pass through the filtering screen, collecting filtrate and residues separately, filtrate was melted palladium, residues were metal platinum. Taking residues, heating to melting temperature $T_{10}=1800°$ C., melting metal platinum, keeping melting for 10 minutes, allowing melted platinum liquor to pass through the filtering screen, collecting filtrate, filtrate was melted platinum.

Example 4

Raw materials: waste cell phones (1 ton)

|  | plastic | battery | Plastic Shell, liquid crystal display | Cu | Pb | Ag | Au | Pd |
|---|---|---|---|---|---|---|---|---|
| content/kg | 350 | 303 | 210 | 130 | 0.1 | 3.5 | 0.34 | 0.14 |
| Melting point/° C. | 500 | / | / | 1083 | 327 | 960 | 1063 | 1552 |

Process:

Step (1)

Dismantling and breaking up batteries, plastic shell, and liquid crystal display. Approximately 500 kg of the remaining waste materials were broken up into particles having size less than 20 mm, and then transferred to secondary crusher to break up into particles having size less than 5 mm Step (2)

The materials above were put into electrostatic separation device for electrostatic separation to obtain 137 kg of metal-rich part and 350 kg of plastic-rich part.

Step (3)

Putting into magnetic separation machine to remove materials containing ferromagnetic metals like iron, cobalt, nickel, etc, passing through 3~5 mesh sieve.

Step (4)

Feeding the materials above into microwave heating device from the feed inlet while closing the feed inlet valve and sub-pipeline valve. Heating to pyrolysis temperature $T_1=500°$ C. by microwave to remove residual organic matters in metal-rich part, opening exhaust outlet valve and collecting gases generated by pyrolysis.

Analyzing metal-rich part, the results were: silver 3.5 kg, gold 0.34 kg, palladium 0.14 kg. Target noble metals were arranged according to ascending order of melting point of noble metals.

|  | Target noble metals | | |
|---|---|---|---|
|  | I<br>Ag | II<br>Au | III<br>Pd |
| Melting point | 960° C. | 1063° C. | 1552° C. |

Step (5)

Recycling silver: commanded by computer, heating to melting temperature $T_2$ by microwave ($T_2$ should be lower than the melting point of silver and higher than the melting point of stannum and antimony), the melting temperature of the present embodiment $T_2=800°$ C., and keeping melting for 10 minutes, closing feed inlet valve and exhaust outlet valve, and opening sub-pipeline valve, allowing melted liquor of low-melting-point metal to pass through the filtering screen, the filtrate was mixed melted liquor of stannum, antimony and lead, the residues were metal-rich part containing silver, copper, gold, platinum and palladium. Taking out solution of stannum, antimony and lead while closing sub-pipeline valve.

Step (6)

commanded by computer, heating to melting temperature $T_3$ by microwave ($T_3$ should be higher than the melting point of silver and lower than the melting point of copper, lead, nickel, gold, platinum and palladium), the melting temperature of the present embodiment $T_3=1000°$ C., and keeping melting for 10 minutes. Opening sub-pipeline valve, allowing melted silver liquor to pass through the filtering screen, filtrate was melted silver liquor, residues were metal-rich part containing copper, gold, platinum and palladium. Taking out melted silver liquor, cooling naturally and casting. Closing sub-pipeline valve.

Step (7): Acid-Liquor-Filtration and Microwave-Melting Method were Applied.

Feeding sulfuric acid (10%) from feed inlet to submerge residues, and metal copper and its oxidants, chlorides were all dissolved in acid liquor and passed through filtering screen. After 30 minutes, opening sub-pipeline valve, taking out saline solution of base metals. Rinsing the feed inlet, vacuum filtrating. Closing sub-pipeline valve. Heating to melting temperature $T_8=1070°$ C. by microwave, melting metal gold, keeping melting for 10 minutes, allowing melted gold liquor to pass through the filtering screen, collecting filtrate and residues separately, filtrate was melted gold, residues contain metal palladium and platinum. Taking residues, heating to melting temperature $T_9=1750°$ C. by microwave, melting metal palladium, keeping melting for 10 minutes, allowing melted palladium liquor to pass through the filtering screen, collecting filtrate and residues separately, filtrate was melted palladium, residues were metal platinum. Taking residues, heating to melting temperature $T_{10}=1800°$ C. by microwave, melting metal palladium, keeping melting for 10 minutes, allowing melted platinum liquor to pass through the filtering screen, collecting filtrate, filtrate was melted platinum.

Example 5

Raw materials: waste materials containing noble metals, lead, nickel, silver, gold, copper, platinum and rhodium.

Steps (1)~(7) were similar to Example 1, the differences lie in the fact that in the present embodiment, temperature $T_7$ should be higher than the melting point of platinum and lower than that of rhodium, and further comprises:

Recycling rhodium: commanded by computer, heating to melting temperature $T_8$ by microwave ($T_8$ should be higher than the melting point of rhodium), the melting temperature of the present embodiment $T_8=2000°$ C., and keeping melting for 10 minutes. Opening vacuum pump to make the pressure in vacuum chamber to decline to 0.5 atmosphere. Closing vacuum pump and feed outlet valve, opening sub-pipeline valve, vacuum filtrating, melted rhodium liquor flows into vacuum chamber spontaneously. Opening feed outlet valve and taking out melted rhodium liquor, cooling naturally and casting. Closing sub-pipeline valve and feed outlet valve.

Example 6

Raw materials: waste materials containing noble metals, lead, nickel, silver, gold, copper, platinum, rhodium, iridium and osmium Steps (1)~(7) were similar to Example 1, the differences lie in the fact that in the present embodiment, temperature $T_7$ should be higher than the melting point of platinum and lower than that of rhodium, and further comprises:

Recycling rhodium: commanded by computer, heating to melting temperature $T_8$ by microwave ($T_8$ should be higher than the melting point of rhodium), the melting temperature of the present embodiment $T_8=2000°$ C., and keeping melting for 10 minutes. Opening vacuum pump to make the pressure in vacuum chamber to decline to 0.5 atmosphere. Closing vacuum pump and feed outlet valve, opening sub-pipeline valve, vacuum filtrating, melted rhodium liquor flows into vacuum chamber spontaneously. Opening feed outlet valve and taking out melted rhodium liquor, cooling naturally and casting. Closing sub-pipeline valve and feed outlet valve.

Recycling iridium: commanded by computers, heating to melting temperature $T_9$ by microwave ($T_9$ should be higher than the melting point of iridium), the melting temperature of the present embodiment $T_9=2500°$ C., and keeping melting for 10 minutes. Opening vacuum pump to make the pressure in vacuum chamber to decline to 0.5 atmosphere. Closing vacuum pump and feed outlet valve, opening sub-pipeline valve, vacuum filtrating, melted iridium liquor flows into vacuum chamber spontaneously. Opening feed outlet valve and taking out melted iridium liquor, cooling naturally and casting. Closing sub-pipeline valve and feed outlet valve. The remainder over the filtering screen was raw colature of noble metal osmium.

Example 7

The present method can also be used to recycle other waste materials containing noble metals, such as dental materials, jewelry and others. The specific steps were similar to Example 1~Example 4, as for waste materials containing noble metals which do not comprise rubber and plastics, step (2) can be omitted; as for waste materials containing noble metals which do not comprise ferromagnetic metals, step (3) can be omitted.

Example 8

An apparatus for recycling noble metals from electronic waste materials containing noble metals, as shown in FIG. 5, comprising: microwave housing 1, microwave transmitter 2, feed inlet 3, temperature detector 4, heating pipes 5, filtering screen 6, exhaust outlet 7, sub-pipeline 8. The microwave housing 1 was hollow, thus forming microwave chamber inside. Microwave transmitter 2 was positioned on the inside wall of microwave housing 1, can supply microwave to generate heat within the microwave housing. The inside wall of the microwave housing 1 has a filtering screen 6 used to separate un-melted solid metals and melted metals, achieving solid-melt separation. The filtering screen 6 have 180 heating pipes 5 (18 per line, 10 lines in total) above used to heat electronic waste materials containing noble metals. The heating pipes 5 were vertically-arranged and open-ended, height 10 cm, pipe diameter 3 mm. The internal spaces of heating pipes 5 were heating chambers provided for electronic waste powders containing noble metals to pass by and to be placed in. The heating pipes 5 can exchange heat with electronic powders containing noble metals placed in the heating chamber, and indirectly heating noble metals to make them melt. The temperature detector 4 used to detect temperature of heating pipes was positioned on heating pipes 5, can reflect the temperature of heating pipes.

Microwave housing also has feed inlet 3 and exhaust outlet 7 that all have valve built in, which was used to control the flow of materials. After pyrolysis of rubber and plastic materials, opening the exhaust outlet valve to release and collecting gases generated by pyrolysis.

At the bottom of microwave housing, there was sub-pipeline 8 which also has valve built in, materials in the microwave housing can be collected after opening the sub-pipeline valve.

Inside wall of microwave housing 1, heating pipes 5, filtering screen 6, sub-pipeline 8 and valves of feed inlet 3, exhaust outlet 7 and sub-pipeline 8 were all made of high temperature resistant ceramic materials.

Example 9

An apparatus for recycling noble metals from electronic waste materials containing noble metals, as shown in FIG. 6, comprising: microwave housing 1, microwave transmitter 2, feed inlet 3, temperature detector 4, heating pipes 5, filtering screen 6, exhaust outlet 7, sub-pipeline 8 (the structure of such units was similar to Example 6). Besides, it also includes vacuum housing 9, vacuum pump 10 and feed outlet 11. The number of heating pipes was 90, height was 100 cm, pipe diameter was 10 mm Vacuum housing 9 connects to sub-pipeline 8 positioned at the bottom of microwave housing 1. Vacuum housing 9 has vacuum pump 10. Vacuum housing was hollow, thus forming vacuum chamber, vacuum chamber connects to microwave chamber; vacuum housing 9 has feed outlet 11 at the bottom. To ensure vacuum filtration, feed inlet valve and exhaust outlet valve can be kept closed during filtration.

Vacuum housing 9, vacuum pump 10 and feed outlet 11 valve were made of high temperature resistant materials.

Because there were few noble metals in ferromagnetism-free metal-rich part, thus may attach to un-melted metals after melting, or noble metals residues/powders may be wrapped inside base metals after base metals were melted, it is hard to achieve solid-melt separation. Sub-pipeline that connects to vacuum chamber is provided at the bottom of microwave reactor, which can filtrate melted metals under pressure, achieving a better solid-melt separation.

Having reasonable design, the apparatus of the present invention is favorable for fastening the reaction, and solid-liquid separation when melting noble metals, and convenient for automatic operation.

What is claimed is:

1. A method for recycling noble metals from electronic waste materials containing noble metals, comprising the following steps:
    (1) taking electronic waste materials containing noble metals, mechanically breaking up and sieving to obtain electronic waste powders containing noble metals;
    (2) taking said electronic waste powders containing noble metals, removing rubber and plastic materials by electrostatic separation, collecting noble metal-rich part;
    (3) taking said noble metal-rich part, removing ferromagnetic metals by magnetic separation, collecting ferromagnetism-free metal-rich part;
    (4) taking and feeding said ferromagnetism-free metal-rich part into heating chamber from feed inlet of microwave reactor, shutting the feed inlet valve and valve that connects the channels, heating to pyrogenation temperature $T1=400~600°$ C. by microwave, collecting gases generated by pyrolysis at exhaust outlet;
    (5) heating to melting temperature $T2=700~900°$ C. by microwave, melting low-melting-point metals whose melting temperature is lower than T2, keeping melting for 5~30 minutes, allowing the melted low-melting-point metal liquor to pass through a filtering screen, collecting filtrate A and residues A separately;
    (6) continue to heat said residues A to melting temperature $T3=990~1020°$ C. by microwave, melting metal silver, keeping melting for 5~30 minutes, allowing melted silver liquor to pass through the filtering screen, collecting filtrate B and residues B separately;
    (7) taking said residues B, applying one or more methods of microwave-melting, acid-liquor filtration, electrolysis and extraction to separate one or more noble metals individually;
    all processes of heating by microwave are conducted in microwave reactor; said microwave reactor comprises microwave housing, microwave transmitter positioned on the inside wall of said microwave housing, a feed inlet positioned inside said microwave housing for feeding, a microwave chamber formed in the hollow microwave housing, a filtering screen positioned on the inside wall of the housing horizontally, one or more heating pipes used to heat electronic waste powders containing noble metals positioned over said filtering screen, said heating pipes whose internal spaces are heating chamber provided for electronic waste powders containing noble metals to pass by and to be placed in are vertically-arranged and open-ended, temperature detector positioned over said heating pipes, which is used to detect the temperature of said heating pipes, exhaust outlet positioned over said microwave housing, which is used to get rid of gases generated by pyrolysis, and sub-pipeline positioned at the bottom of said microwave housing, which is used to discharge materials; feed inlet, exhaust outlet and sub-pipeline all have valves;
    height of said heating pipes is in a range of 10~100 cm, pipe diameter is in a range of 3~10 cm.

2. The method as claimed in claim 1, wherein, said step (5) comprises: heating to melting temperature $T2=700~900°$ C. by microwave, melting low-melting-point metals whose melting temperature is lower than T2, keeping melting for 5~30 minutes, opening vacuum pump, vacuum filtrating at 0.2~0.5 atmosphere, allowing low-melting-point metals to pass through filtering screen, collecting filtrate and residues separately.

3. The method as claimed in claim 1, wherein, said step (6) comprises: heating to melting temperature $T3=990~1020°$ C. by microwave, melting metal silver, keeping melting for 5~30 minutes, opening vacuum pump, vacuum filtrating at 0.2~0.5 atmosphere, allowing melted silver liquor to pass through filtering screen, collecting filtrate B and residues B separately.

4. The method as claimed in claim 1, wherein, microwave-melting method is applied in said step (7): taking residues B, heating to melting temperature $T4=1070~1075°$ C. by microwave, melting metal gold, keeping melting for 5~30 minutes, allowing melted gold liquor to pass through the filtering screen, collecting filtrate C and residues C separately; taking residues C, heating to melting temperature $T5=1480~1520°$ C. by microwave, allowing melted copper liquor to pass through the filtering screen, keeping melting for 5~30 minutes, filtrating, collecting filtrate D and residues D separately; taking residues D, heating to melting temperature $T6=1580~1750°$ C. by microwave, melting metal palladium, keeping melting for 5~30 minutes, allowing melted palladium liquor to pass through the filtering screen, collecting filtrate E and residues E separately; taking residues E, heating to melting temperature $T7=1800~1900°$ C. by microwave, melting metal platinum, keeping melting for 5~30 minutes, allowing melted platinum liquor to pass through the filtering screen, collecting filtrate F and residues F separately.

5. The method as claimed in claim 1, wherein, acid-liquor filtration method and microwave-melting method are applied in said step (7): taking residues B, adding a strong acid selected from hydrochloric acid, nitric acid, and sulfuric acid, dissolving metal copper, copper oxides and copper chlorides in acid liquor and passing through the filtering screen to form filtrate G and residues G; taking residues G, heating to melting temperature T8=1070~1075° C. by microwave, melting metal gold, keeping melting for 5~30 minutes, allowing melted gold liquor to pass through the filtering screen, collecting filtrate H and residues H separately; taking residues H, heating to melting temperature T9=1580~1750° C. by microwave, melting metal palladium, keeping melting for 5~30 minutes, allowing melted palladium liquor to pass through the filtering screen, collecting filtrate I and residues I separately; taking residues I, heating to melting temperature T10=1800~1900° C. by microwave, melting metal platinum, keeping melting for 5~30 minutes, allowing melted platinum liquor to pass through the filtering screen, collecting filtrate J and residues J separately.

6. The method as claimed in claim 1, wherein, said step (7) acid-liquor filtration method and either electrolysis or extraction are applied in said step (7): taking residues B, adding a strong acid selected from hydrochloric acid, nitric acid, and sulfuric acid to submerge the residues, dissolving metal copper, copper oxides and copper chlorides in acid liquor and passing through the filtering screen to form filtrate G and residues G; separating the residues G by electrolysis or extraction, collecting metal gold, palladium and platinum separately.

7. The method as claimed in claim 4, wherein, said filtration in said step (7) is vacuum filtration.

8. The method as claimed in claim 5, wherein, said filtration in said step (7) is vacuum filtration.

9. The method as claimed in claim 6, wherein, said filtration in said step (7) is vacuum filtration.

* * * * *